Figure 1:
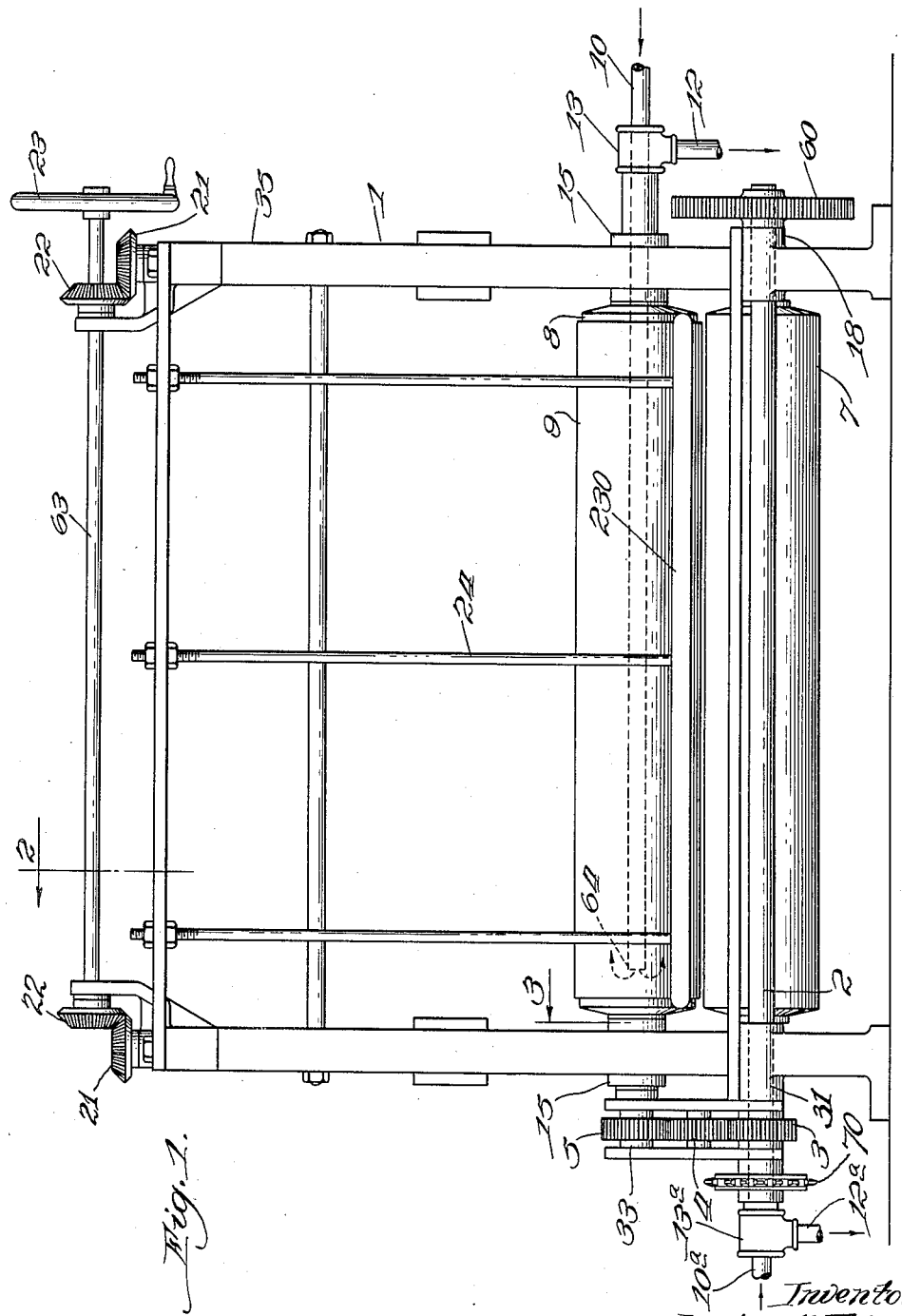

Sept. 5, 1939.   L. M. TOLMAN ET AL   2,171,611
METHOD OF REMOVING FAT FROM ANIMAL CASINGS
Filed May 10, 1937   2 Sheets-Sheet 1

Inventors:
Lucius M. Tolman
Lloyd E. Dimond
By Chitton, Wiles, Davis, Hirschl & Dawson
Attys.

Sept. 5, 1939.   L. M. TOLMAN ET AL   2,171,611
METHOD OF REMOVING FAT FROM ANIMAL CASINGS
Filed May 10, 1937   2 Sheets-Sheet 2
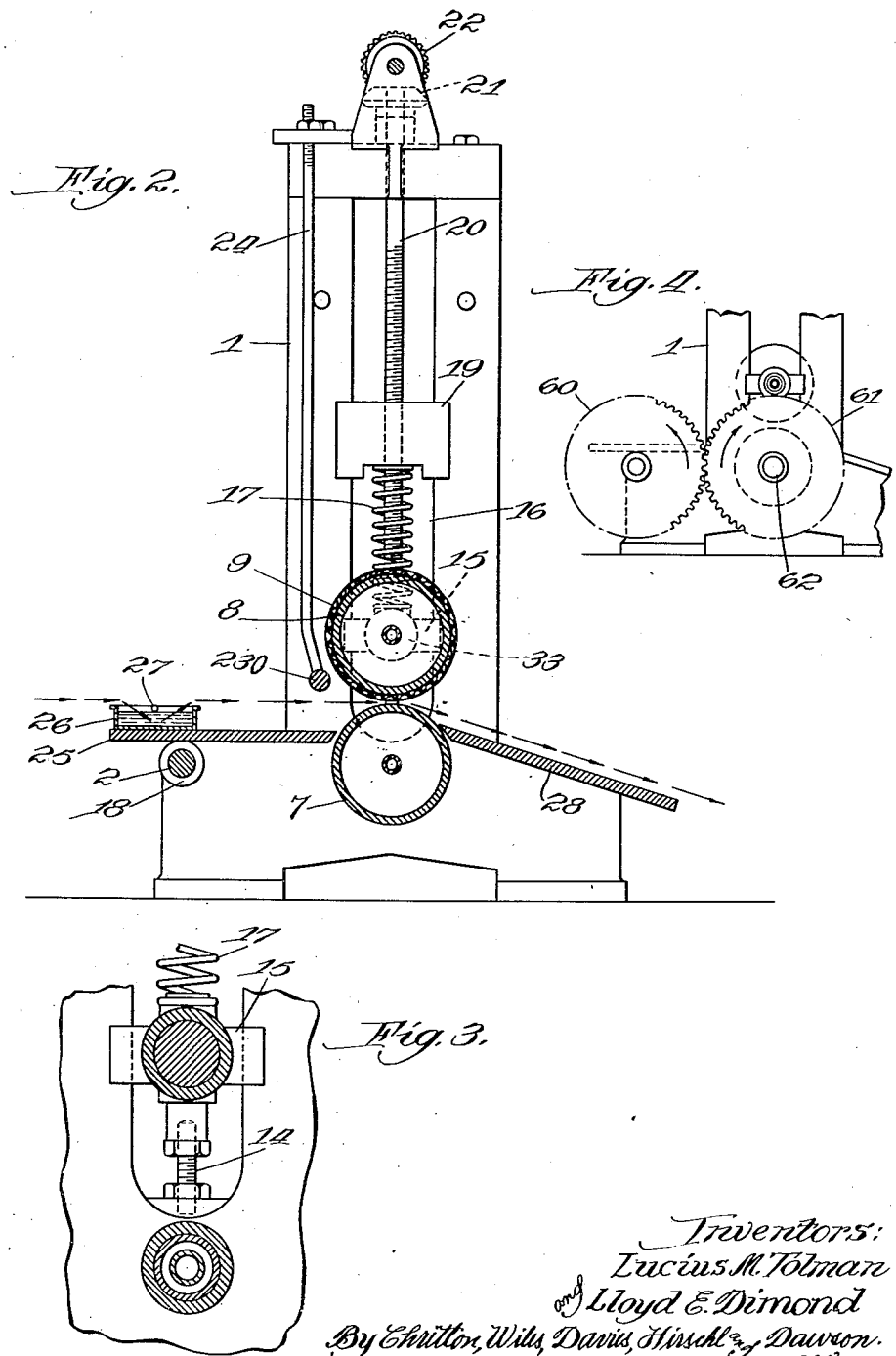
Inventors:
Lucius M. Tolman
Lloyd E. Dimond
By Chritton, Wiles, Davis, Hirschl & Dawson
Attys.

Patented Sept. 5, 1939

2,171,611

UNITED STATES PATENT OFFICE 2,171,611

METHOD OF REMOVING FAT FROM ANIMAL CASINGS

Lucius M. Tolman and Lloyd E. Dimond, Chicago, Ill., assignors to Wilson & Company, a corporation of Delaware Application May 10, 1937, Serial No. 141,879

6 Claims. (Cl. 17—45)

This invention relates to a method of removing fat from animal casings and an apparatus therefor.

Up to the present time animal casings prepared from intestines and the like have been treated for the removal of fat clinging to the surface thereof by shearing, cutting or scraping. This work has required a considerable amount of time and labor and likewise it is impossible to remove all of the fat and attempts to remove even a considerable portion thereof are likely to cause considerable damage to the casings by scores, cracks, or other mutilations. This is true even of hand operations, which are even more expensive than the mechanical methods heretofore employed.

By means of the present invention fat is removed from the casings to a degree not heretofore practicable and at much lower cost.

A form of apparatus which is suitable for carrying out the method is illustrated in the drawings, in which Fig. 1 is a front elevation of the casing de-fatting machine; Fig. 2 is a sectional side elevation of the machine taken along the line 2 of Fig. 1; Fig. 3 is a vertical section taken along the line 3 of Fig. 1; and Fig. 4 is a fragmentary end view.

The apparatus comprises a bolted cast-iron frame 1 supporting bearings 18 and 31, adjusting screws 14 and movable bearings 15 for the shaft 33. A cylindrical metal roll 7 is journaled in bearings not shown and is propelled by the drive shaft 2 which is mounted in the base of the frame 1. The drive shaft is propelled by the sprocket 70 (Fig. 1, between gear 3 and stuffing box 13a) which is driven in any suitable manner. Gear 60 meshes with gear 61 on shaft 62 of the roll 7 and drives that roll.

The metal roll 8 is mounted in the frame above roll 7 and is covered by a suitable cloth 9. The cloth cover 9 aids in feeding the casings between the rolls and providing uniformity of movement. A preferred cloth for this purpose is a flannel such as canton flannel in which the fuzzy side of the weave is outward. This roll is driven from shaft 2 by the gears 3, 4 and 5, 3 being mounted on shaft 2, 4 being an idler gear separating gears 3 and 5, and 5 being mounted on the shaft 33 carrying the roll 8. The roller shaft 33 is mounted in the traveling bearings 15, above referred to, which are free to move up and down in the slots 16 of the frame. Springs 17 adjustably mounted as shown in Fig. 3 limit the movement of these bearings. Adjustment may be secured by the adjusting screws 14 which limit the downward movement of the bearing. The springs are constrained at their upper ends by the holders 19 which are threaded about the threaded bolts 20 vertically secured in the frame. The wheel 23 is geared to the gears 21 mounted on the upper end of the bolts 20 and may be used to adjust the height of the spring holders 19, thereby increasing or diminishing the compressive force of the springs. The gears 22 are operated by the wheel 23 mounted on an extension of the shaft 63.

Both rolls 7 and 8 are heated preferably by hot water, for example by the pipes 10 and 10a mounted inside the shafts upon which the rolls are mounted. Water passes inwardly through the pipes and out the ends 64 of the pipes and into the inside of the roll and is withdrawn around the pipe and out at 12 and 12a after passing through the stuffing boxes 13 and 13a. (The inner end of pipe 10a is not shown in the drawings but the pipe is internally arranged like pipe 10.)

A safety guard rod 230, mounted upon elongated bolts 24 which are secured to the frame member 35, is provided.

At the incoming side of the device a shallow pan of water 26 is supported on the platform 25 in order to wet the casings slightly before passing them through the rolls. A guide rod 27 is provided at the surface of the water to force the casings beneath it.

A scraper 28 is provided at the exit side of the rolls to scrape the casings from the lower roll. With proper covering for the upper roll no scraper is required on it. The scraper is preferably made of a thermo-plastic material like "Bakelite."

In operating the process the casings are dried in any convenient manner with the fat side exposed, to a moisture content preferably below 40%. Preferably the casings are split and doubled so that the material passing through the rolls consists of a pair of flat strips having the fatty side of each exposed, and the originally inner sides of each strip being together and unexposed. In drying the casings they are first cut to the desired length, placed around a mandrel and subjected to a drying atmosphere. A preferred moisture content is about 15% for the purpose of this invention.

The dried casings are then passed through the pan of water 26, the time of treatment being so short that no substantial amount of water is soaked into the casing but the surface thereof is moistened. This wetting step is not essential in the process, but has been found to eliminate or substantially decrease a tendency of some casings to leave a greasy-feeling surface.

The rolls are heated to a temperature preferably between 140° F. and 160° F. and the casings are passed through the heated rolls at a fairly slow rate of speed.

The rolls are preferably separated from each other by a distance of .005" to .050". The spring pressure is so adjusted on the rolls that they will separate further before tearing a casing.

The temperature and pressure of the rolls are so adjusted as to wring the fat from the surface. It is therefore important that the heat, amount of moisture present, speed of the rolls and the pressure be correlated so that the casing remains relatively hard while the fat is softened.

The casing emerging from the rolls is entirely or almost entirely fat free. The water present apparently keeps the fat from wetting the surface of the casing.

What we claim as new and desire to secure by Letters Patent is:

1. The method of de-fatting a fatty animal casing comprising drying the casing to a moisture content below 40%, melting the fat upon the surface, and removing the melted fat by pressure.

2. The method of de-fatting a fatty animal casing comprising drying the casing to a moisture content below 40%, applying superficial moisture to the dried casing, and removing the melted fat by pressure.

3. The method of de-fatting a fatty animal casing comprising drying the casing to a moisture content of about 15%, melting the fat upon the surface, and removing the melted fat by pressure.

4. The method of de-fatting an animal casing which comprises hardening the casing, melting fat upon the surface of the casing, and removing the melted fat from the hardened casing by a wringing operation.

5. The method of de-fatting an animal casing which comprises cleaning and hardening the natural casing, progressively melting fat upon the surface of the hardened casing, and progressively removing the melted fat from the hardened casing by a wringing operation.

6. The method as set forth in claim 3 in which the fat is melted progressively upon the surface of the casing and the pressure is progressively applied.

LUCIUS M. TOLMAN.
LLOYD E. DIMOND.